United States Patent
Preisig et al.

(10) Patent No.: US 11,342,767 B2
(45) Date of Patent: May 24, 2022

(54) MULTI-VOLTAGE CHARGING TERMINAL ACCESS PORT

(71) Applicant: VOLVO TRUCK CORPORATION, Gothenburg (SE)

(72) Inventors: Nicolas Preisig, Ödsmål (SE); Christopher Goris, Lexington, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 69 days.

(21) Appl. No.: 16/981,920

(22) PCT Filed: Mar. 21, 2018

(86) PCT No.: PCT/US2018/023492
§ 371 (c)(1),
(2) Date: Sep. 17, 2020

(87) PCT Pub. No.: WO2019/182580
PCT Pub. Date: Sep. 26, 2019

(65) Prior Publication Data
US 2021/0126475 A1    Apr. 29, 2021

(51) Int. Cl.
*H02J 7/00* (2006.01)
*B60L 53/16* (2019.01)
(Continued)

(52) U.S. Cl.
CPC ........... *H02J 7/0042* (2013.01); *B60L 53/16* (2019.02); *B60L 53/30* (2019.02); *H01R 13/4534* (2013.01)

(58) Field of Classification Search
CPC .............................. H02J 7/0042; B60L 53/16
(Continued)

(56) References Cited

U.S. PATENT DOCUMENTS

| | | |
|---|---|---|
| 2,477,803 A | 8/1949 | Huber |
| 4,532,418 A | 7/1985 | Meese et al. |

(Continued)

FOREIGN PATENT DOCUMENTS

| | | |
|---|---|---|
| CN | 205882012 U | 1/2017 |
| WO | WO 2012/112144 A1 | 8/2012 |

OTHER PUBLICATIONS

International Search Report and Written Opinion of the International Searching Authority, PCT/US2018/023492, dated May 15, 2018, 13 pages.
(Continued)

*Primary Examiner* — Suchin Parihar
(74) *Attorney, Agent, or Firm* — Sage Patent Group

(57) ABSTRACT

A multi-voltage charging terminal access port includes at least one housing, a first charging terminal within the housing and configured to receive a first charging voltage, a second charging terminal within the housing and configured to receive a second charging voltage that is different from the first charging voltage, a first movable cover plate mounted within the housing, the first movable cover plate including a first access hole and being movable between a first position in which the first access hole is laterally offset from the first charging terminal to obstruct access to the first charging terminal and a second position in which the first access hole is aligned with the first charging terminal to allow access to the first charging terminal.

21 Claims, 7 Drawing Sheets

(51) Int. Cl.
*B60L 53/30* (2019.01)
*H01R 13/453* (2006.01)

(58) Field of Classification Search
USPC .......................................................... 320/107
See application file for complete search history.

(56) References Cited

U.S. PATENT DOCUMENTS

| | | | | |
|---|---|---|---|---|
| 5,444,352 | A | 8/1995 | Hutchings | |
| 5,478,249 | A | 12/1995 | Crestin | |
| 10,050,558 | B2 * | 8/2018 | Ito | H02H 7/1222 |
| 10,250,056 | B2 * | 4/2019 | Miller | G06F 1/263 |
| 11,220,991 | B2 * | 1/2022 | Wurth | F02N 11/0862 |
| 2008/0079389 | A1 * | 4/2008 | Howell | H02J 7/1438 |
| | | | | 320/104 |
| 2011/0148190 | A1 * | 6/2011 | Gronwald | B60L 3/0069 |
| | | | | 307/9.1 |
| 2017/0232911 | A1 * | 8/2017 | Carnick | B60R 16/0238 |
| | | | | 49/395 |
| 2019/0106006 | A1 * | 4/2019 | Ng | H01R 12/716 |
| 2019/0164486 | A1 * | 5/2019 | An | G09G 3/3233 |

OTHER PUBLICATIONS

Extended European Search Report, EP18910492.0, dated Sep. 23, 2021, 11 pages.

* cited by examiner

MULTI-VOLTAGE CHARGING TERMINAL ACCESS PORT

CROSS REFERENCE TO RELATED APPLICATIONS

This application is a 35 U.S.C. § 371 national stage application of PCT International Application No. PCT/US2018/023492 filed on Mar. 21, 2018, the disclosure and content of which is incorporated by reference herein in its entirety.

FIELD

The inventive concepts relate to vehicle electrical systems, and in particular to multi-voltage battery systems for vehicles.

BACKGROUND

Some vehicles, including heavy construction vehicles, may include 24 volt (24V) electrical systems for powering various loads in the vehicle. A 24V vehicle electrical system typically includes first and second 12 volt (12V) batteries arranged in series to provide a total of 24 volts for powering 24V loads. In this arrangement, the batteries are referred to as the "lower battery" and the "upper battery," because the positive terminal of the upper battery is at a higher electric potential than the positive terminal of the lower battery. Thus, 24V loads can be powered from the positive terminal of the upper battery, while 12V loads can be powered from the positive terminal of the lower battery. When the engine of the vehicle is running, the batteries are charged by a 24V alternator that is connected across both batteries.

In the event that one of the batteries has insufficient charge to operate the vehicle, it is important for there to be a safe and simple way for an operator to jump start the vehicle from either a 12V source or a 24V source. However, attaching a 24V source to a 12V electrical system can damage the 12V electrical system.

SUMMARY

Some embodiments provide a multi-voltage charging terminal access port including at least one housing, a first charging terminal within the housing and configured to receive a first charging voltage, a second charging terminal within the housing and configured to receive a second charging voltage that is different from the first charging voltage, a first movable cover plate mounted within the housing, the first movable cover plate including a first access hole and being movable between a first position in which the first access hole is laterally offset from the first charging terminal to obstruct access to the first charging terminal and a second position in which the first access hole is aligned with the first charging terminal to allow access to the first charging terminal, and a second movable cover plate mounted within the housing and including a second access hole and being movable between a third position in which the second access hole is laterally offset from the second charging terminal to obstruct access to the second charging terminal and a fourth position in which the second access hole is aligned with the second charging terminal to allow access to the second charging terminal.

A multi-voltage charging terminal access port according to further embodiments includes at least one housing, a first charging terminal within the housing and configured to receive a first charging voltage, a second charging terminal within the housing and configured to receive a second charging voltage that is different from the first charging voltage, and a movable cover plate mounted within the housing, the movable cover plate including a first access hole and a second access hole. The movable cover plate is movable between a first position, a second position and a third position. When the movable cover plate is in the first position, the first access hole is laterally offset from the first charging terminal to obstruct access to the first charging terminal and the second access hole is aligned with the second charging terminal to allow access to the second charging terminal. When the movable cover plate is in the second position, the first access hole is aligned with the first charging terminal to allow access to the first charging terminal and the second access hole is laterally offset from the second charging terminal to obstruct access to the second charging terminal, and when the movable cover plate is in the third position, the movable cover plate obstructs access to both the first charging terminal and the second charging terminal.

A multi-voltage charging terminal access port according to further embodiments includes at least one housing, a lid attached to the housing and movable between an open position and a closed position, a release pin attached to the lid, a fixed plate including a detent latch attached to the housing, the fixed plate includes a release hole therethrough aligned with the detent latch, when the lid is in the closed position, the release pin extends through the release hole and into the detent latch, a first charging terminal within the housing and configured to receive a first charging voltage, a second charging terminal within the housing and configured to receive a second charging voltage that is different from the first charging voltage, and a movable cover plate mounted within the housing, the movable cover plate including an access hole therethrough and a locking pin extending from the movable cover plate towards the fixed plate, wherein the movable cover plate is movable between a first position and a second position. When the movable cover plate is in the first position, the access hole is laterally offset from the first charging terminal to obstruct access to the first charging terminal, and when the movable cover plate is in the second position, the access hole is aligned with the first charging terminal to allow access to the first charging terminal and the locking pin extends into and is held in place by the detent latch. When the lid is moved into the closed position while the movable cover plate is in the second position, the release pin is configured to push the locking pin out of the detent latch and allow the movable cover plate to move back to the first position.

Other apparatus and/or methods for battery charging will be or become apparent to one with skill in the art upon review of the following drawings and shall be included within this description and protected by the accompanying claims. Moreover, it is intended that all embodiments disclosed herein can be implemented separately or combined in any way and/or combination unless expressly excluded.

ASPECTS

A multi-voltage charging terminal access port according to one aspect includes at least one housing, a first charging terminal within the housing and configured to receive a first charging voltage, a second charging terminal within the housing and configured to receive a second charging voltage that is different from the first charging voltage, a first movable cover plate mounted within the housing, the first movable cover plate including a first access hole and being movable between a first position in which the first access hole is laterally offset from the first charging terminal to obstruct access to the first charging terminal and a second position in which the first access hole is aligned with the first charging terminal to allow access to the first charging terminal, and a second movable cover plate mounted within the housing and including a second access hole and being movable between a third position in which the second access hole is laterally offset from the second charging terminal to obstruct access to the second charging terminal and a fourth position in which the second access hole is aligned with the second charging terminal to allow access to the second charging terminal.

In one aspect, when the first movable cover plate is in the second position, the first movable cover plate obstructs access to the second charging terminal, and when the second movable cover plate is in the fourth position, the second movable cover plate obstructs access to the first charging terminal.

In one aspect, the multi-voltage charging terminal access port further includes a fixed cover plate above the first and second movable cover plates, the first movable cover plate includes a first locking pin extending therefrom toward the fixed cover plate, and the fixed cover plate includes a detent latch configured to receive and hold the first locking pin when the first movable cover plate is in the second position.

In one aspect, the second movable cover plate includes a second locking pin extending therefrom toward the fixed cover plate, and the detent latch is configured to receive and hold the second locking pin when the second movable cover plate is in the fourth position.

In one aspect, fixed cover plate includes a release hole therethrough, the release hole is aligned with the detent latch, and the multi-voltage charging terminal access port further includes a lid rotatably attached to the housing, and a release pin attached the lid. The lid is rotatable between an open position and a closed position. When the lid is in the closed position, the release pin extends through the release hole in the fixed cover plate and into the detent latch.

In one aspect, the multi-voltage charging terminal access port further includes a first spring attached to the first movable cover plate and configured to bias the first movable cover plate in the first position, and a second spring attached to the second movable cover plate and configured to bias the second movable cover plate in the third position. When the first movable cover plate is in the second position, the first movable cover plate is held in position by the detent latch against a bias force exerted by the first spring, and when the second movable cover plate is in the fourth position, the second movable cover plate is held in position by the detent latch against a bias force exerted by the second spring.

In one aspect, when the lid is closed, the release pin extends through the release hole in the fixed cover plate and into the detent latch.

In one aspect, when the lid is closed, the release pin is arranged to push the first locking pin or the second locking pin out of the detent latch, when the first locking pin is pushed out of the detent latch, the bias force of the first spring causes the first movable cover plate to return to the first position, and when the second locking pin is pushed out of the detent latch, the bias force of the second spring causes the second movable cover plate to return to the third position.

In one aspect, the multi-voltage charging terminal access port further includes a first pair of guide rails mounted on an interior of the housing, the first movable cover plate is slidable along the first pair of guide rails between the first and second positions, and a second pair of guide rails mounted on the interior of the housing. The second movable cover plate is slidable along the second pair of guide rails between the third and fourth positions.

In one aspect, the first movable cover plate includes a first tab that extends from a side of the first movable cover plate, the first locking pin extends from the first tab toward the fixed cover plate, and the second movable cover plate includes a second tab that extends from a side of the second movable cover plate. The second locking pin extends from the second tab toward the fixed cover plate.

A multi-voltage charging terminal access port according to another aspect includes at least one housing, a first charging terminal within the housing and configured to receive a first charging voltage, a second charging terminal within the housing and configured to receive a second charging voltage that is different from the first charging voltage, and a movable cover plate mounted within the housing, the movable cover plate including a first access hole and a second access hole. The movable cover plate is movable between a first position, a second position and a third position. When the movable cover plate is in the first position, the first access hole is laterally offset from the first charging terminal to obstruct access to the first charging terminal and the second access hole is aligned with the second charging terminal to allow access to the second charging terminal. When the movable cover plate is in the second position, the first access hole is aligned with the first charging terminal to allow access to the first charging terminal and the second access hole is laterally offset from the second charging terminal to obstruct access to the second charging terminal, and when the movable cover plate is in the third position, the movable cover plate obstructs access to both the first charging terminal and the second charging terminal.

In one aspect, the multi-voltage charging terminal access port further includes a fixed cover plate above the movable cover plate. The movable cover plate includes a locking pin extending therefrom toward the fixed cover plate. The fixed cover plate includes a first detent latch configured to receive and hold the locking pin when the movable cover plate is in the first position and a second detent latch configured to receive and hold the locking pin when the movable cover plate is in the second position.

In one aspect, the fixed cover plate includes a first release hole therethrough and a second release hole therethrough, the first release hole is aligned with the first detent latch and the second release hole is aligned with the second detent latch, and the multi-voltage charging terminal access port further includes a lid rotatably attached to the housing, and first and second release pins attached the lid. The lid is rotatable between an open position and a closed position. When the lid is in the closed position, the first release pin extends through the first release hole in the fixed cover plate and into the first detent latch and the second release pin extends through the second release hole in the fixed cover plate and into the second detent latch.

In one aspect, the multi-voltage charging terminal access port further includes a spring attached to the movable cover plate and configured to bias the movable cover plate in the third position. When the movable cover plate is in the first position, the movable cover plate is held in position by the first detent latch against a first bias force exerted by the spring, and when the movable cover plate is in the second position, the movable cover plate is held in position by the second detent latch against a second bias force exerted by the spring.

In one aspect, the first bias force and the second bias force are directed in opposite directions.

In one aspect, when the lid is closed, the first release pin extends through the first release hole in the fixed cover plate and into the first detent latch, and the second release pin extends through the second release hole in the fixed cover plate and into the second detent latch.

In one aspect, when the lid is closed, the first release pin is arranged to push the first locking pin out of the first detent latch and the second release pin is arranged to push the second locking pin out of the second detent latch, and when the first locking pin is pushed out of the first detent latch, the first bias force of the spring causes the movable cover plate to return to the third position, and when the second locking pin is pushed out of the second detent latch, the second bias force of the spring causes the movable cover plate to return to the third position.

In one aspect, the multi-voltage charging terminal access port further includes a pair of guide rails mounted on an interior of the housing, the movable cover plate is slidable along the pair of guide rails between the first, second and third positions.

In one aspect, the movable cover plate includes a tab that extends from a side of the first movable cover plate, and the locking pin extends from the tab toward the fixed cover plate.

A multi-voltage charging terminal access port according to one aspect includes at least one housing, a lid attached to the housing and movable between an open position and a closed position, a release pin attached to the lid, a fixed plate including a detent latch attached to the housing, the fixed plate includes a release hole therethrough aligned with the detent latch, when the lid is in the closed position, the release pin extends through the release hole and into the detent latch, a first charging terminal within the housing and configured to receive a first charging voltage, a second charging terminal within the housing and configured to receive a second charging voltage that is different from the first charging voltage, and a movable cover plate mounted within the housing, the movable cover plate including an access hole therethrough and a locking pin extending from the movable cover plate towards the fixed plate, wherein the movable cover plate is movable between a first position and a second position. When the movable cover plate is in the first position, the access hole is laterally offset from the first charging terminal to obstruct access to the first charging terminal, and when the movable cover plate is in the second position, the access hole is aligned with the first charging terminal to allow access to the first charging terminal and the locking pin extends into and is held in place by the detent latch. When the lid is moved into the closed position while the movable cover plate is in the second position, the release pin is configured to push the locking pin out of the detent latch and allow the movable cover plate to move back to the first position.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION OF EMBODIMENTS

As noted in the Background section above, multi-voltage vehicles may have both a 12V electrical system and a 24V electrical system. In the event a vehicle operator needs to jump start the system, it is desirable to be able to provide external charge from a 12V source or a 24V source. However, attaching a 24V source to a 12V electrical system can damage the 12V electrical system of the vehicle. Attaching an external charge source to a vehicle for jump starting is often performed in harsh environments, possibly in the dark or with little available light. It is possible that an operator may incorrectly attach a charging source to the wrong charging terminal on the vehicle being jump started, e.g., attaching a 24V charging source to a 12V terminal. Some vehicles may even have more than two electrical systems, e.g., 12V, 24V and 48V systems in the same vehicle.

Some embodiments address one or more of the issues described above by providing a charging terminal access port with multiple charging terminals that are covered by a movable plate that is movable to expose and provide access to only one charging terminal at a time.

Various embodiments are described herein by way of non-limiting examples in the context of a multi-voltage vehicle electrical system. It is to be understood that the embodiments are not limited to the particular configurations disclosed herein. Moreover, although various embodiments are described in the context of dual-voltage vehicle electrical systems, it will be appreciated that the concepts and embodiments described herein may be extended to vehicle electrical systems with more than two voltage subsystems.

Figure 1A:
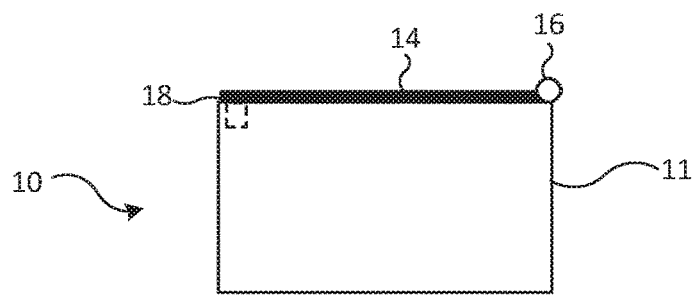
FIGS. 1A and 1B are side views of a multi-voltage charging access port according to some embodiments.
Figure 1B:
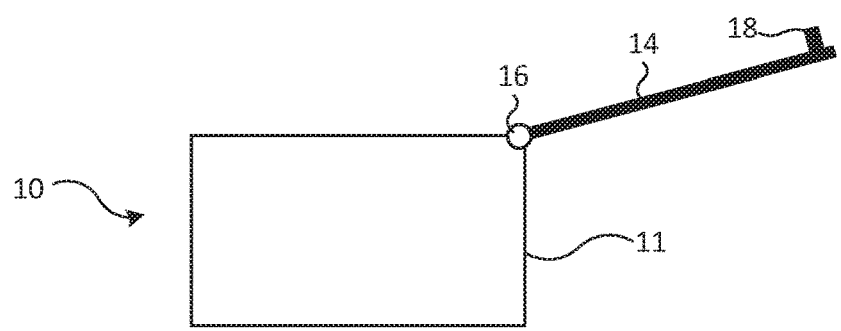
Figure 1C:
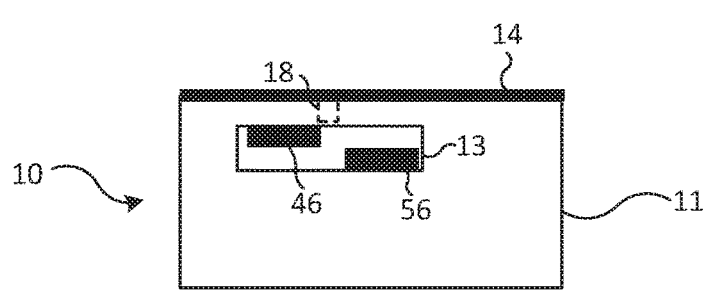
FIG. 1C is a front view of a multi-voltage charging access port according to some embodiments.
Figure 1D:
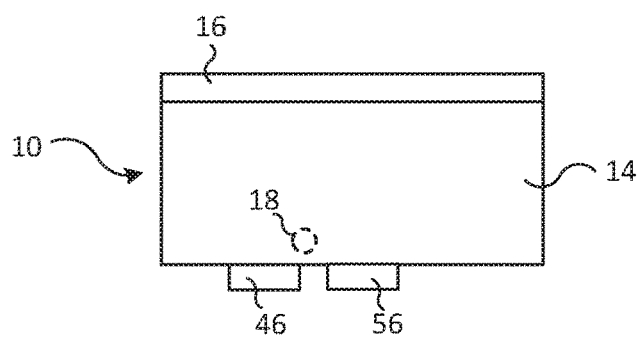
FIG. 1D is a top view of a multi-voltage charging access port according to some embodiments.

Reference is now made to FIGS. 1A to 1D. FIGS. 1A and 1B are side views of a multi-voltage charging access port 10 according to some embodiments, FIG. 1C is a front view of the multi-voltage charging access port 10, and FIG. 1D is a top view of the multi-voltage charging access port 10.

The multi-voltage charging terminal access port 10, or simply charging terminal access port 10, includes at least one housing 11 and a movable lid 14 that is attached to the housing 11 via a hinge 16. Although the housing 11 is illustrated as a single unitary element, it will be appreciated that the housing 11 may include multiple housings joined and/or mounted together. The hinge 16 may be spring biased so that when the lid 14 is opened it remains in the open position (FIG. 1B) until it is manually closed by an operator. The lid 14 includes a release pin 18 that, when the lid 14 is in the closed position (FIG. 1A), protrudes into the housing 11. As shown in FIGS. 1C and 1D, first and second tabs 46, 56 may protrude from a front side of the charging terminal access port 10 through an opening 13 therein. The function of the release pin 18 and the first and second tabs 46, 56 is described in greater detail below.

Figure 2A:
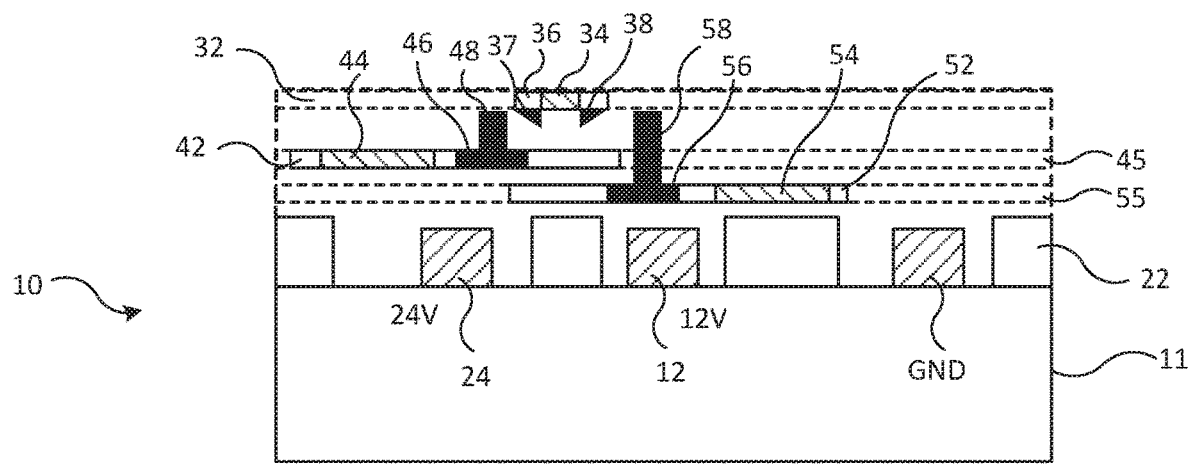
FIGS. 2A, 2B and 2C are cross-sectional views of a multi-voltage charging access port according to some embodiments.
Figure 2B:
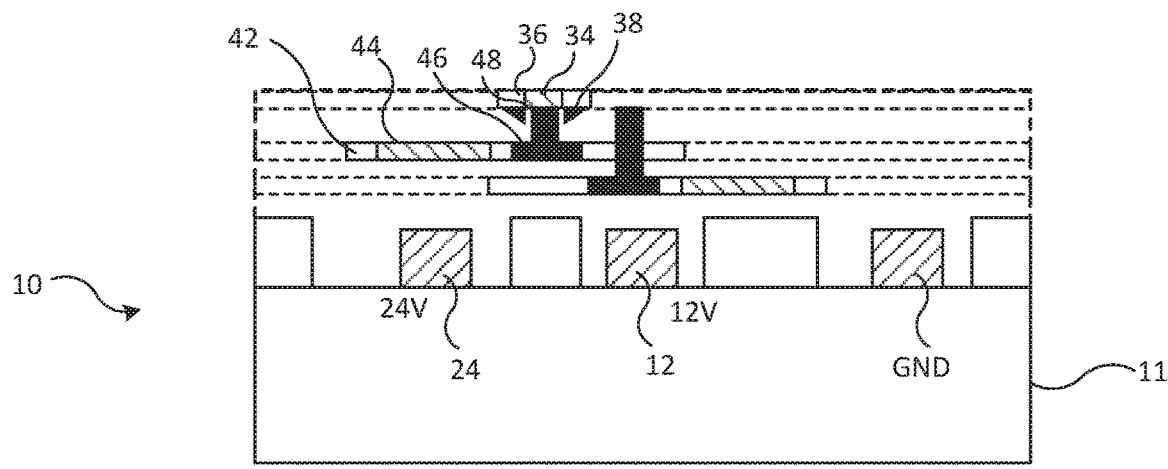
Figure 2C:
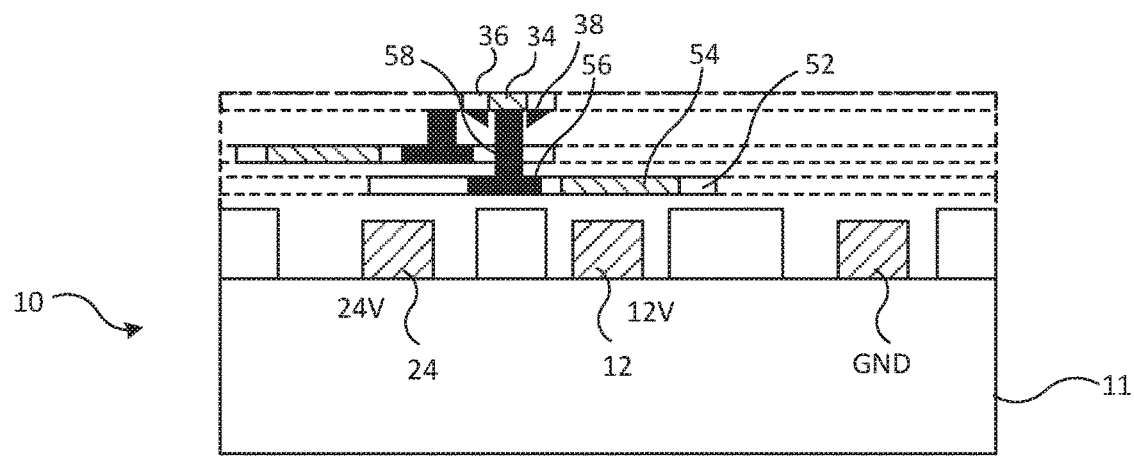
Figure 3A:
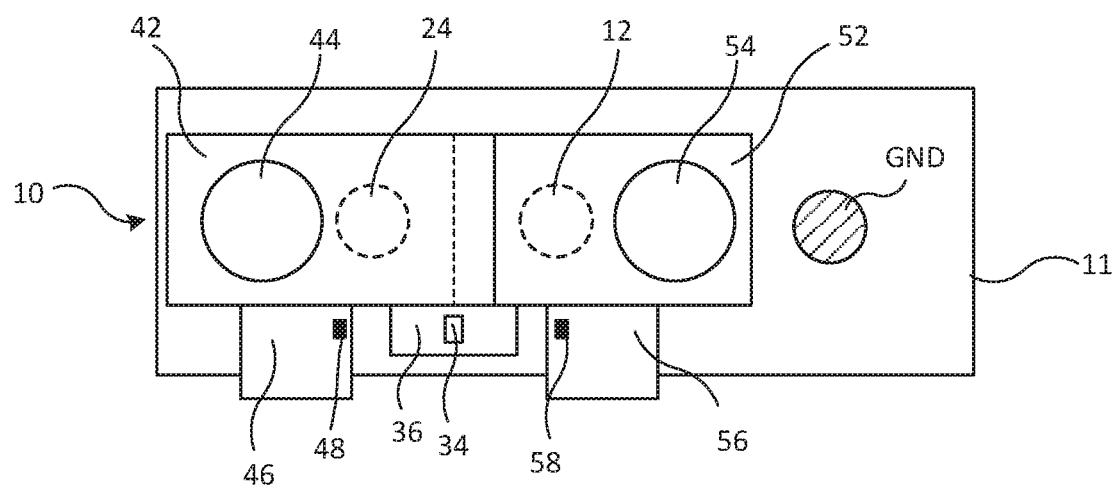
FIGS. 3A, 3B and 3C are top views of a multi-voltage charging access port according to some embodiments.
Figure 3B:
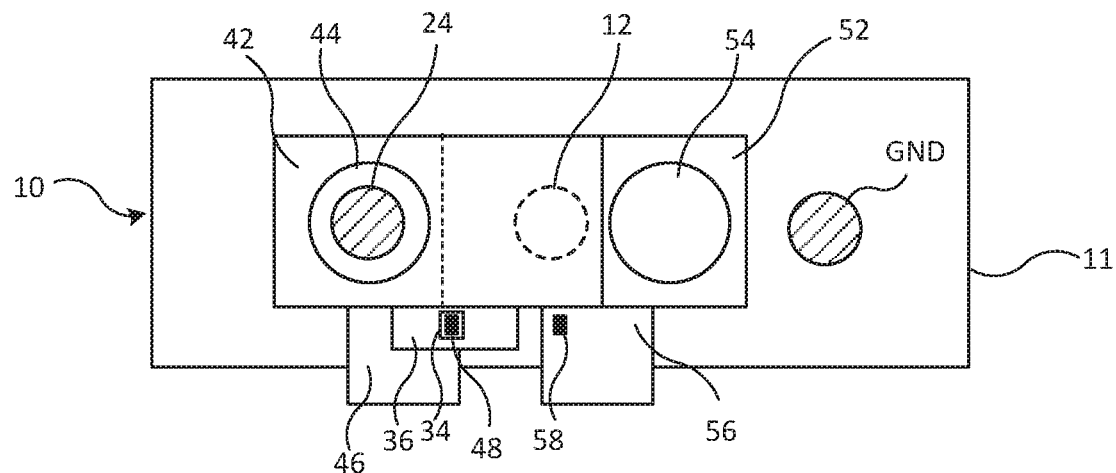
Figure 3C:
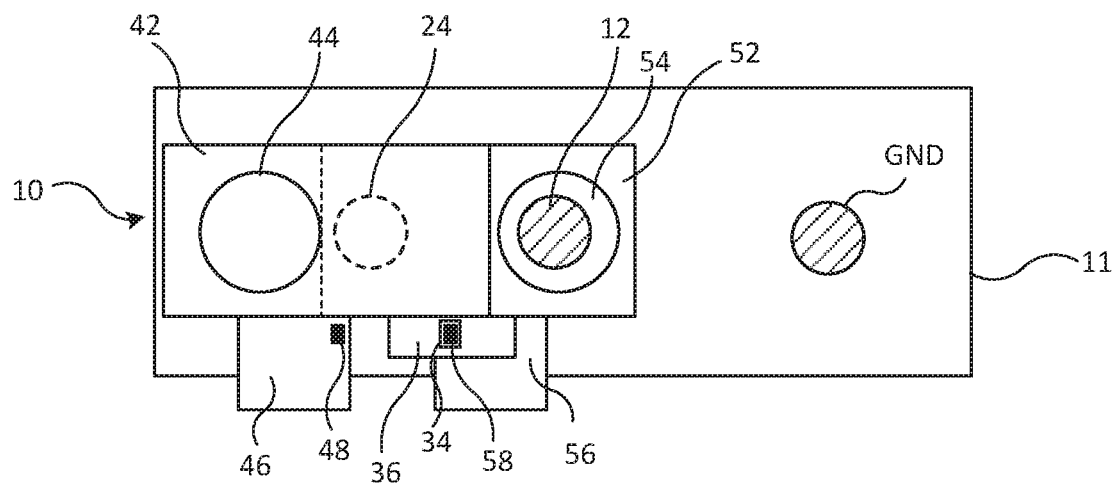
Figure 4:
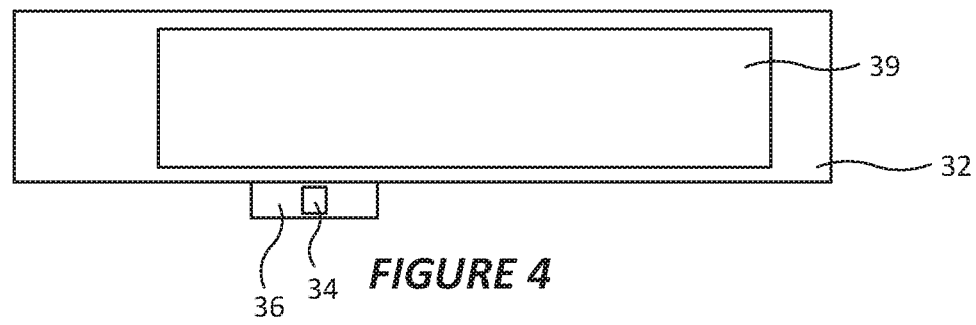
FIG. 4 illustrates a component of a multi-voltage charging access port according to some embodiments.
Figure 5A:
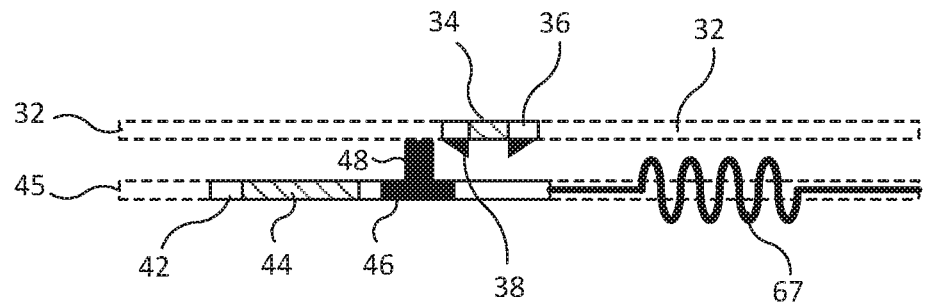
FIGS. 5A, 5B, 5C, 5D, 5E and 5F are cross-sectional views illustrating some components of a multi-voltage charging access port according to some embodiments.
Figure 5B:
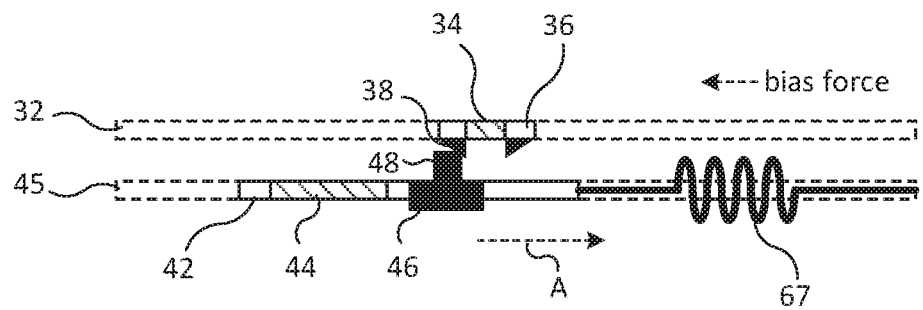
Figure 5C:
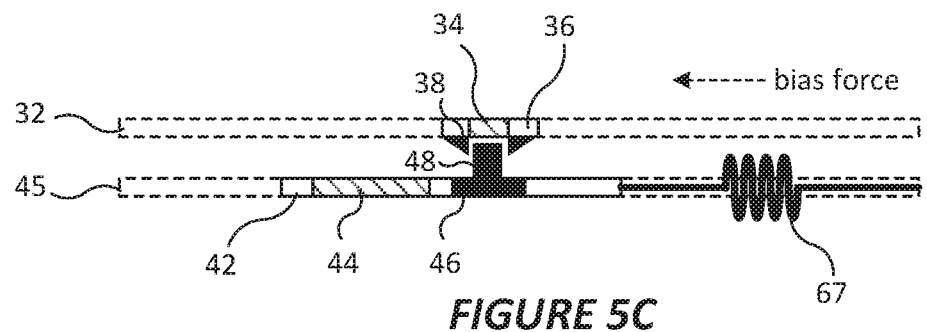
Figure 5D:
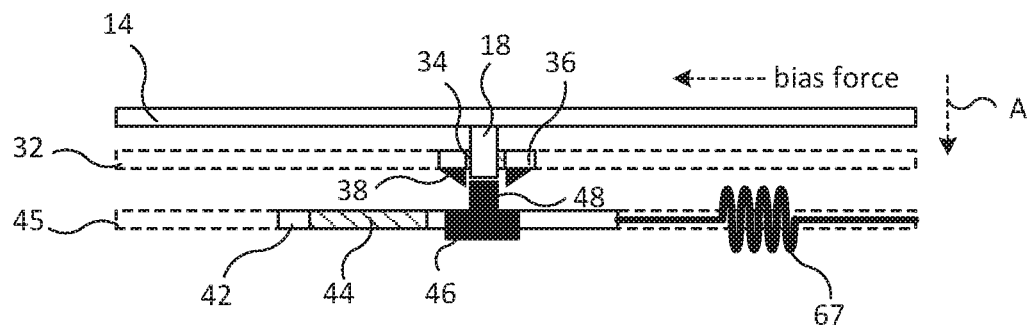
Figure 5E:
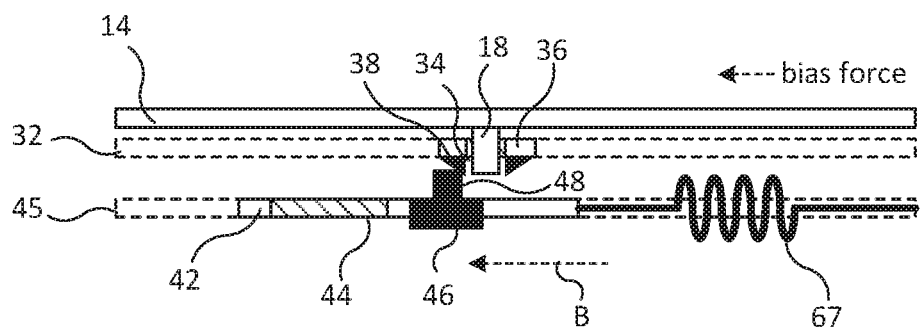
Figure 5F:
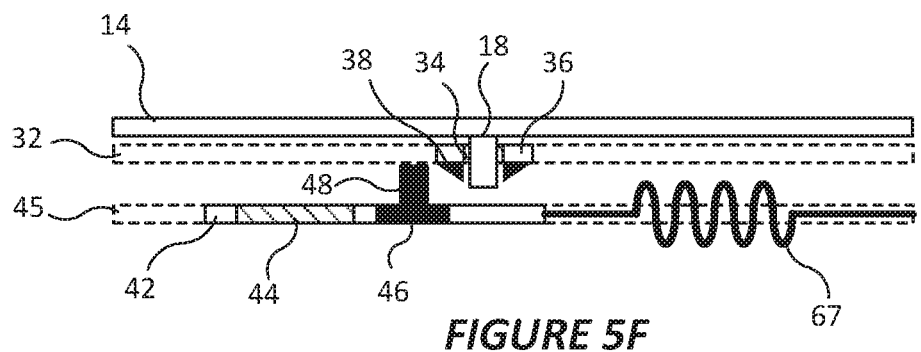

FIGS. 2A, 2B and 2C are cross-sectional views, and FIGS. 3A, 3B and 3C are top views, of a multi-voltage charging access port according to some embodiments. Referring to FIGS. 2A, 2B, 2C, 3A, 3B and 3C, a charging terminal access port 10 according to some embodiments includes a plurality of charging terminals within the housing 11, including a 24-volt charging terminal 24, a 12-volt charging terminal 12, and a ground terminal GND. The charging terminals 12, 24 and the ground terminal GND may be provided as conductive metallic posts that are electrically connected to an electronics system of a vehicle. The charging terminals are recessed within the housing 11, and may separated into individual compartments by walls 22. First and second movable cover plates 42, 52 are mounted within housing 11 above the charging terminals. A fixed cover plate 32 is provided in the housing 11 above the movable cover plates 42, 52. Brief reference is made to FIG. 4, which illustrates a fixed cover plate 32 in accordance with some embodiments. As seen in FIG. 4, the fixed cover plate 32 includes an opening or aperture 39 therein that is sized to expose the 12-volt charging terminal 12, the 24-volt charging terminal 24 and the ground terminal GND. The fixed cover plate 21 further includes a tab 36 including an aperture 34 therethrough that acts as a release hole. The tab 36 extends from a side of the fixed cover plate 21.

Referring again to FIGS. 2A, 2B, 2C, 3A, 3B and 3C, the movable cover plates 42, 52 are slidably mounted on interior rails 45, 55 that allow the movable cover plates 42, 52 to slide back and forth (left and right in the Figures) within the housing 11.

The first movable cover plate 42 includes a first access hole 44 and is movable between a first position (FIGS. 2A and 3A) in which the first access hole 44 is laterally offset from the 24V charging terminal 24 to obstruct access to the 24V charging terminal 24 and a second position (FIGS. 2B and 3B) in which the first access hole 44 is vertically aligned with the 24V charging terminal 24 to allow an operator to access to the 24V charging terminal 24 through the first access hole 44. The second movable cover plate 52 is mounted within the housing 11 and includes a second access hole 54 and is movable between a first position (FIGS. 2A and 3A) in which the second access hole 54 is laterally offset from the 12V charging terminal 12 to obstruct access to the 12V charging terminal 24 and a second position (FIGS. 2C and 3C) in which the second access hole 54 is vertically aligned with the 12V charging terminal 12 to allow an operator to access to the 12V charging terminal 12 the second access hole 54.

As can be seen in FIGS. 2B, 2C, 3B and 3C, when the first movable cover plate 42 is in the second position in which the 24V charging terminal 24 is exposed, the first movable cover plate 42 obstructs access to the 12V charging terminal 12, and when the second movable cover plate 52 is in the second position in which the 12V charging terminal 12 is exposed, the second movable cover plate 52 obstructs access to the 24V charging terminal 24. Moreover, the first movable cover plate 42 and the second movable cover plate 52 cannot simultaneously be in the second position.

Referring again to FIGS. 2A, 2B, 2C, 3A, 3B and 3C, the charging terminal access port 10 includes a fixed cover plate 32 above the first and second movable cover plates 42, 52. The fixed cover plate 32 includes a tab 36 extending from a side of the fixed cover plate 32. The tab 36 includes a release hole 34 therethrough and a detent latch mechanism 37 including opposing wedge-shaped detents 38 on opposite sides of the release hole 34. The first movable cover plate 42 includes a tab 46 extending from a side of the first movable cover plate 42 and a first locking pin 48 extending vertically from the tab 46 toward the fixed cover plate 32. As seen in FIG. 2B, the detent latch mechanism 37 is configured to receive and hold the first locking pin 48 when the first movable cover plate 42 is moved into the second position. When the first movable cover plate 42 is in the second position, it is locked in place by the detent latch mechanism 37 and the first locking pin 48. In this position, the first locking pin 48 is held in place by the detent latch mechanism beneath the release hole 34 in the tab 36.

Similarly, the second movable cover plate 52 includes a tab 56 extending from a side of the second movable cover plate 52 and a second locking pin 58 extending vertically from the tab 56 toward the fixed cover plate 32. As seen in FIG. 2C, the detent latch mechanism 37 is configured to receive and hold the second locking pin 58 when the second movable cover plate 52 is moved into the second position. When the second movable cover plate 52 is in the second position, it is locked in place by the detent latch mechanism 37 and the second locking pin 48. In this position, the second locking pin 58 is held in place by the detent latch mechanism beneath the release hole 34 in the tab 36.

When the first movable cover plate 42 is locked in the second position, it blocks the second movable cover plate 52 from being moved into the second position, and vice-versa. Regardless of the position of the first movable cover plate 42 or the second movable cover plate 52, neither movable cover plate blocks the ground terminal GND, which is accessible through the aperture 39 in the fixed cover plate 32.

As noted above, the charging terminal access port 10 includes a lid 14 that is rotatably attached to the housing 11, and a release pin 18 attached the lid. The lid 14 is rotatable between an open position and a closed position. When the lid 14 is in the closed position, the release pin 18 extends through the release hole 34 in the fixed cover plate 32 and into the detent latch mechanism. When the lid 14 is moved into the closed position while either the first or second movable cover plate 42, 52 is in the second (latched) position, the release pin 18 moves into the release hole 34 and pushes the locking pin 48, 58 out of the detent latch mechanism 37, allowing whichever of the movable cover plates 42, 52 that was in the second position to release from the detent latch mechanism 37 and move back to the first (unlatched) position.

Referring to FIGS. 5A to 5F, which illustrate some internal features of a charging terminal access port 10 according to some embodiments, the charging terminal access port 10 further includes a first spring 67 attached to the first movable cover plate 42 and configured to bias the first movable cover plate 42 in the first position, and a second spring (not shown) attached to the second movable cover plate 52 and configured to bias the second movable cover plate 52 in the first position. When the first movable cover plate 42 is in the second position, the first movable cover plate 42 is held in position by the detent latch mechanism 37 against a bias force exerted by the first spring 67, and when the second movable cover plate 52 is in the second position, the second movable cover plate 52 is held in position by the detent latch mechanism 37 against a bias force exerted by the second spring.

When the lid 14 of the charging terminal access port 10 is closed, the release pin 18 extends through the release hole 34 in the fixed cover plate 32 and into the detent latch mechanism 37. When the lid 14 is closed, the release pin 18 is arranged to push the first locking pin 48 or the second locking pin 58 out of the detent latch mechanism 37. When the first locking pin 48 is pushed out of the detent latch mechanism 37, the bias force of the first spring 67 causes the first movable cover plate 42 to return to the first position, and when the second locking pin 58 is pushed out of the detent latch mechanism 37, the bias force of the second spring causes the second movable cover plate 52 to return to the second position.

Figure 6A:
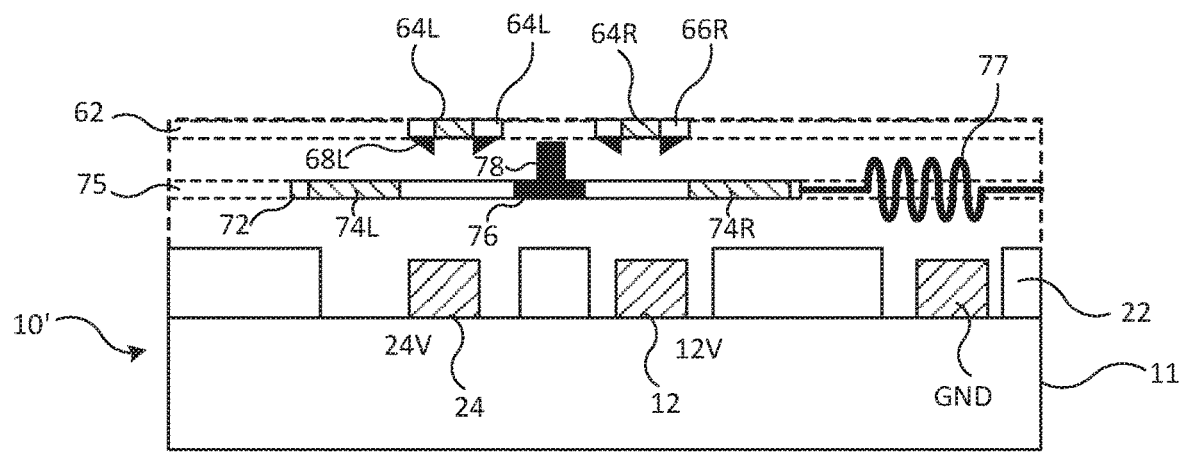
FIGS. 6A, 6B and 6C are cross-sectional views of a multi-voltage charging access port according to further embodiments.
Figure 6B:
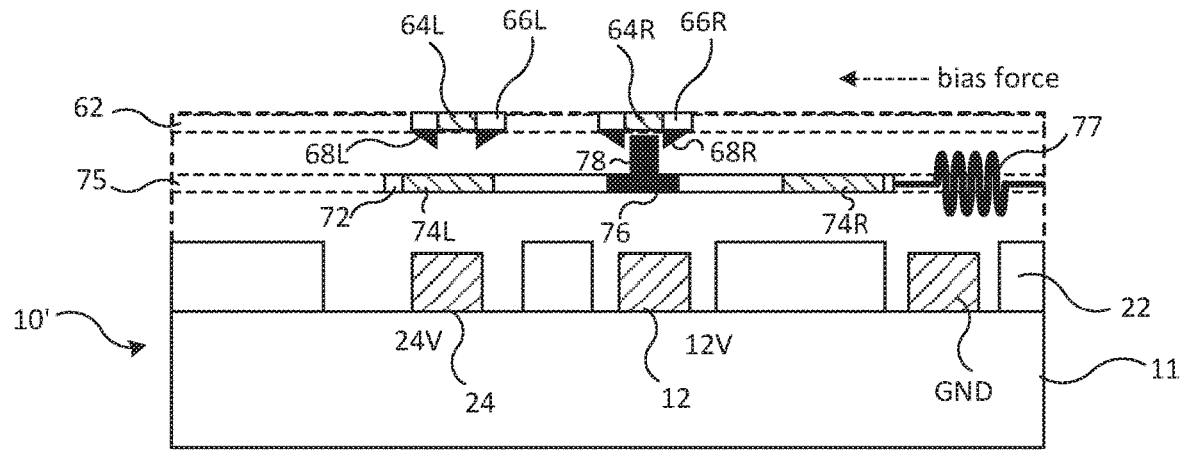
Figure 6C:
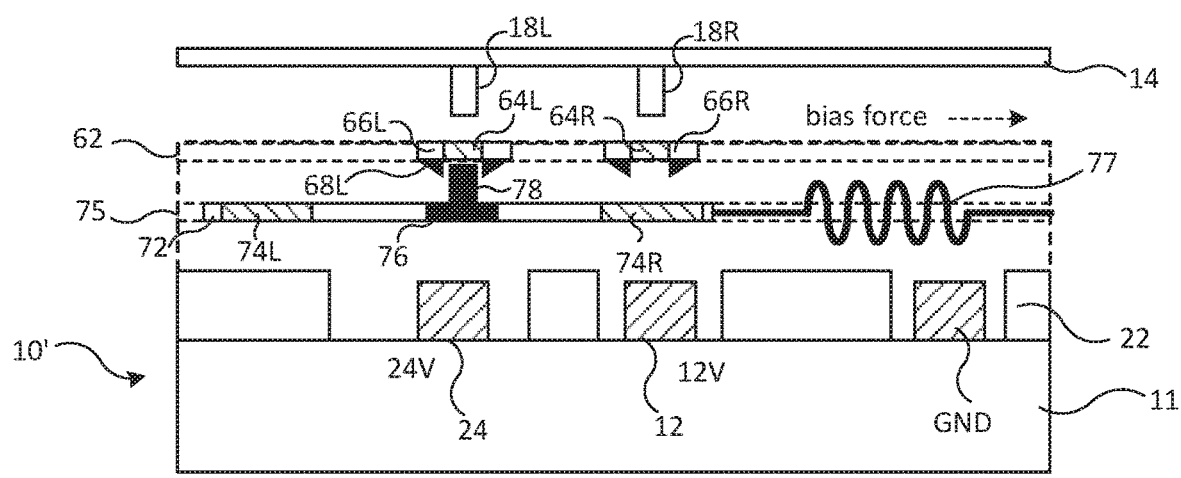

A charging terminal access port 10' according to further embodiments is illustrated in FIGS. 6A to 6C. As shown therein, a charging terminal access port 10' according to further embodiments includes a housing 11, a first charging terminal 24 within the housing 11 and configured to receive a first charging voltage, a second charging terminal 12 within the housing and configured to receive a second charging voltage that is different from the first charging voltage. The charging terminal access port 10' includes a movable cover plate 72 slidably mounted within the housing 11 and including a first access hole 74L and a second access hole 74R. The movable cover plate 72 is movable between a first position (FIG. 6C), a second position (FIG. 6B) and a third position (FIG. 6A). When the movable cover plate 72 is in the first position (FIG. 6C), the first access hole 74L is laterally offset from the first charging terminal 24V to obstruct access to the first charging terminal 24, and the second access hole 74R is vertically aligned with the second charging terminal 12 to allow access to the second charging terminal 12 by an operator. When the movable cover plate 72 is in the second position (FIG. 6B), the first access hole 74L is vertically aligned with the first charging terminal 24 to allow access to the first charging terminal 24 by an operator, and the second access hole 74R is laterally offset from the second charging terminal 12 to obstruct access to the second charging terminal 12. When the movable cover plate is in the third position (FIG. 6A), the movable cover plate 72 obstructs access to both the first charging terminal 12 and the second charging terminal 12.

The movable cover plate 72 includes a tab 76 and a vertical locking pin 78 extending therefrom toward a fixed cover plate 62 that includes a first tab 66L including a first release hole 64L therethrough and a first detent latch mechanism 68L and a second tab 66R including a second release hole 64R therethrough and a second detent latch mechanism 68R. When the movable cover plate 72 is in the first position (FIG. 6C), it is locked in place by the vertical locking pin 78 and the first detent latch mechanism 68L. When the movable cover plate 72 is in the second position (FIG. 6B), it is locked in place by the vertical locking pin 78 and the second detent latch mechanism 68R.

Referring to FIG. 6C, the lid 14 of the charging terminal access port 10' includes a first release pin 18L aligned with the first release hole 64L and a second release pin 18R aligned with the second release hole 64R. When the lid 14 is in the closed position, the first release pin 18L extends into the first release hole 64L to release the locking pin 78 from the first release hole 64L if the movable cover plate 72 is in the first position and the second release pin 18R extend into the second release hole 64R to release the locking pin 78 from the second release hole 64R if the movable cover plate 72 is in the second position. A bias spring 77 exerts a bias force on the movable cover plate 72 to return it from the first position or the second position to the third position.

When an element is referred to as being "connected", "coupled", "responsive", "mounted", or variants thereof to another element, it can be directly connected, coupled, responsive, or mounted to the other element or intervening elements may be present. In contrast, when an element is referred to as being "directly connected", "directly coupled", "directly responsive", "directly mounted" or variants thereof to another element, there are no intervening elements present. Like numbers refer to like elements throughout. As used herein, the singular forms "a", "an" and "the" are intended to include the plural forms as well, unless the context clearly indicates otherwise. Well-known functions or constructions may not be described in detail for brevity and/or clarity. The term "and/or" and its abbreviation "/" include any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but do not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Persons skilled in the art will recognize that certain elements of the above-described embodiments may variously be combined or eliminated to create further embodiments, and such further embodiments fall within the scope and teachings of inventive concepts. It will also be apparent to those of ordinary skill in the art that the above-described embodiments may be combined in whole or in part to create additional embodiments within the scope and teachings of inventive concepts. Thus, although specific embodiments of, and examples for, inventive concepts are described herein for illustrative purposes, various equivalent modifications are possible within the scope of inventive concepts, as those skilled in the relevant art will recognize. Accordingly, the scope of inventive concepts is determined from the appended claims and equivalents thereof.

The invention claimed is:

1. A multi-voltage charging terminal access port, comprising:
  at least one housing;
  a first charging terminal within the at least one housing and configured to receive a first charging voltage;
  a second charging terminal within the at least one housing and configured to receive a second charging voltage that is different from the first charging voltage;
  a first movable cover plate mounted within the at least one housing, the first movable cover plate comprising a first access hole and being movable between a first position wherein the first access hole is laterally offset from the first charging terminal to obstruct access to the first charging terminal and a second position wherein the first access hole is aligned with the first charging terminal to allow access to the first charging terminal; and a second movable cover plate mounted within the at least one housing, the second movable cover plate comprising a second access hole and being movable between a third position wherein the second access hole is laterally offset from the second charging terminal to obstruct access to the second charging terminal and a fourth position wherein the second access hole is aligned with the second charging terminal to allow access to the second charging terminal.

2. The multi-voltage charging terminal access port of claim 1, wherein when the first movable cover plate is in the second position, the first movable cover plate obstructs access to the second charging terminal, and wherein when the second movable cover plate is in the fourth position, the second movable cover plate obstructs access to the first charging terminal.

3. The multi-voltage charging terminal access port of claim 1, further comprising:
a fixed cover plate above the first and second movable cover plates;
wherein the first movable cover plate comprises a first locking pin extending therefrom toward the fixed cover plate;
wherein the fixed cover plate comprises a detent latch configured to receive and hold the first locking pin when the first movable cover plate is in the second position.

4. The multi-voltage charging terminal access port of claim 3, wherein the second movable cover plate comprises a second locking pin extending therefrom toward the fixed cover plate; and
wherein the detent latch is configured to receive and hold the second locking pin when the second movable cover plate is in the fourth position.

5. The multi-voltage charging terminal access port of claim 3 or 1, wherein the fixed cover plate comprises a release hole therethrough, wherein the release hole is aligned with the detent latch, and wherein the multi-voltage charging terminal access port further comprises:
a lid rotatably attached to the at least one housing; and
a release pin attached the lid;
wherein the lid is rotatable between an open position and a closed position, wherein when the lid is in the closed position, the release pin extends through the release hole in the fixed cover plate and into the detent latch.

6. The multi-voltage charging terminal access port of claim 5, further comprising:
a first spring attached to the first movable cover plate and configured to bias the first movable cover plate in the first position; and
a second spring attached to the second movable cover plate and configured to bias the second movable cover plate in the third position;
wherein when the first movable cover plate is in the second position, the first movable cover plate is held in position by the detent latch against a bias force exerted by the first spring; and
wherein when the second movable cover plate is in the fourth position, the second movable cover plate is held in position by the detent latch against a bias force exerted by the second spring.

7. The multi-voltage charging terminal access port of claim 6, wherein, when the lid is closed, the release pin extends through the release hole in the fixed cover plate and into the detent latch.

8. The multi-voltage charging terminal access port of claim 7, wherein when the lid is closed, the release pin is arranged to push the first locking pin or the second locking pin out of the detent latch, when the first locking pin is pushed out of the detent latch, the bias force of the first spring causes the first movable cover plate to return to the first position, and when the second locking pin is pushed out of the detent latch, the bias force of the second spring causes the second movable cover plate to return to the third position.

9. The multi-voltage charging terminal access port of claim 1, further comprising:
a first pair of guide rails mounted on an interior of the at least one housing, wherein the first movable cover plate is slidable along the first pair of guide rails between the first and second positions; and
a second pair of guide rails mounted on the interior of the at least one housing, wherein the second movable cover plate is slidable along the second pair of guide rails between the third and fourth positions.

10. The multi-voltage charging terminal access port of claim 4, wherein the first movable cover plate comprises a first tab that extends from a side of the first movable cover plate, wherein the first locking pin extends from the first tab toward the fixed cover plate, and wherein the second movable cover plate comprises a second tab that extends from a side of the second movable cover plate, wherein the second locking pin extends from the second tab toward the fixed cover plate.

11. A multi-voltage charging terminal access port, comprising:
at least one housing;
a first charging terminal within the at least one housing and configured to receive a first charging voltage;
a second charging terminal within the at least one housing and configured to receive a second charging voltage that is different from the first charging voltage; and
a movable cover plate mounted within the at least one housing, the movable cover plate comprising a first access hole and a second access hole;
wherein the movable cover plate is movable between a first position, a second position and a third position;
wherein, when the movable cover plate is in the first position, the first access hole is laterally offset from the first charging terminal to obstruct access to the first charging terminal and the second access hole is aligned with the second charging terminal to allow access to the second charging terminal;
wherein, when the movable cover plate is in the second position, the first access hole is aligned with the first charging terminal to allow access to the first charging terminal and the second access hole is laterally offset from the second charging terminal to obstruct access to the second charging terminal; and
wherein, when the movable cover plate is in the third position, the movable cover plate obstructs access to both the first charging terminal and the second charging terminal.

12. The multi-voltage charging terminal access port of claim 11, further comprising:
a fixed cover plate above the movable cover plate;
wherein the movable cover plate comprises a locking pin extending therefrom toward the fixed cover plate; and wherein the fixed cover plate comprises a first detent latch configured to receive and hold the locking pin when the movable cover plate is in the first position and a second detent latch configured to receive and hold the locking pin when the movable cover plate is in the second position.

13. The multi-voltage charging terminal access port of claim 12, wherein the fixed cover plate comprises a first release hole therethrough and a second release hole therethrough, wherein the first release hole is aligned with the first detent latch and the second release hole is aligned with the second detent latch, and wherein the multi-voltage charging terminal access port further comprises:
a lid rotatably attached to the at least one housing; and
first and second release pins attached the lid;
wherein the lid is rotatable between an open position and a closed position, wherein when the lid is in the closed position, the first release pin extends through the first release hole in the fixed cover plate and into the first detent latch and the second release pin extends through the second release hole in the fixed cover plate and into the second detent latch.

14. The multi-voltage charging terminal access port of claim 13, further comprising:
a spring attached to the movable cover plate and configured to bias the movable cover plate in the third position;
wherein when the movable cover plate is in the first position, the movable cover plate is held in position by the first detent latch against a first bias force exerted by the spring; and
wherein when the movable cover plate is in the second position, the movable cover plate is held in position by the second detent latch against a second bias force exerted by the spring.

15. The multi-voltage charging terminal access port of claim 14, wherein the first bias force and the second bias force are directed in opposite directions.

16. The multi-voltage charging terminal access port of claim 14, wherein, when the lid is closed, the first release pin extends through the first release hole in the fixed cover plate and into the first detent latch, and the second release pin extends through the second release hole in the fixed cover plate and into the second detent latch.

17. The multi-voltage charging terminal access port of claim 16, wherein when the lid is closed, the first release pin is arranged to push the first locking pin out of the first detent latch and the second release pin is arranged to push the second locking pin out of the second detent latch; and
wherein when the first locking pin is pushed out of the first detent latch, the first bias force of the spring causes the movable cover plate to return to the third position, and when the second locking pin is pushed out of the second detent latch, the second bias force of the spring causes the movable cover plate to return to the third position.

18. The multi-voltage charging terminal access port of any of claim 11, further comprising:
a pair of guide rails mounted on an interior of the at least one housing, wherein the movable cover plate is slidable along the pair of guide rails between the first, second and third positions.

19. The multi-voltage charging terminal access port of claim 12, wherein the movable cover plate comprises a tab that extends from a side of the first movable cover plate, wherein the locking pin extends from the tab toward the fixed cover plate.

20. A multi-voltage charging terminal access port, comprising:
at least one housing;
a lid attached to the at least one housing and movable between an open position and a closed position;
a release pin attached to the lid;
a fixed plate comprising a detent latch attached to the at least one housing, wherein the fixed plate comprises a release hole therethrough aligned with the detent latch, wherein when the lid is in the closed position, the release pin extends through the release hole and into the detent latch;
a first charging terminal within the at least one housing and configured to receive a first charging voltage;
a second charging terminal within the at least one housing and configured to receive a second charging voltage that is different from the first charging voltage; and
a movable cover plate mounted within the at least one housing, the movable cover plate comprising an access hole therethrough and a locking pin extending from the movable cover plate towards the fixed plate, wherein the movable cover plate is movable between a first position and a second position;
wherein, when the movable cover plate is in the first position, the access hole is laterally offset from the first charging terminal to obstruct access to the first charging terminal;
wherein, when the movable cover plate is in the second position, the access hole is aligned with the first charging terminal to allow access to the first charging terminal and the locking pin extends into and is held in place by the detent latch; and
wherein, when the lid is moved into the closed position while the movable cover plate is in the second position, the release pin is configured to push the locking pin out of the detent latch and allow the movable cover plate to move back to the first position.

21. A multi-voltage charging terminal access port, comprising:
at least one housing;
a first charging terminal within the at least one housing and configured to receive a first charging voltage;
a second charging terminal within the at least one housing and configured to receive a second charging voltage that is different from the first charging voltage;
a first movable cover mounted to the at least one housing, the first movable cover
being movable between an open position in which the first charging terminal is accessible for charging and a closed position in which the first charging terminal is inaccessible for charging;
a second movable cover that is movable between an open position in which the second charging terminal is accessible for charging and a closed position in which the second charging terminal is inaccessible for charging; and
a lid on the at least one housing that is movable between an open position and a closed position, wherein when the lid is moved from the open position into the closed position, both the first and second movable covers are placed in their respective closed positions.

* * * * *